United States Patent
Seki

(10) Patent No.: US 6,796,655 B2
(45) Date of Patent: Sep. 28, 2004

(54) PROJECTION-TYPE DISPLAY APPARATUS

(75) Inventor: Toshihide Seki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 33 days.

(21) Appl. No.: 10/267,786

(22) Filed: Oct. 10, 2002

(65) Prior Publication Data

US 2003/0193649 A1 Oct. 16, 2003

(30) Foreign Application Priority Data

Apr. 11, 2002 (JP) ........................................ 2002-108890

(51) Int. Cl.$^7$ ......................... G03B 21/14; G03B 21/26; G03B 21/28; H04N 9/31; G02F 1/1335

(52) U.S. Cl. ............................. 353/20; 353/31; 353/33; 353/34; 353/37; 349/9; 348/744; 348/801

(58) Field of Search .............................. 353/20, 30, 31, 353/34, 37, 94, 98, 99; 349/5, 7, 8, 9; 348/744, 798, 801

(56) References Cited

U.S. PATENT DOCUMENTS 6,318,863 B1 * 11/2001 Tiao et al. ..................... 353/31
2003/0231497 A1 * 12/2003 Sakata et al. ................ 362/341

FOREIGN PATENT DOCUMENTS

| JP | 8-76078 | 3/1996 | ............. G02F/1/13 |
| JP | 42431 | 2/2001 | ............ G03B/21/14 |
| JP | 249400 | 9/2001 | ............ G03B/21/00 |

* cited by examiner

Primary Examiner—Russell Adams
Assistant Examiner—Melissa J. Koval
(74) Attorney, Agent, or Firm—Birch, Stewart, Kolasch & Birch, LLP

(57) ABSTRACT

A projection-type display apparatus including a light source, an integrator whose input plane receives a light emitted from the light source and whose output plane serves as a surface illuminant, an image forming device modulating an incident linearly-polarized light beam to form an image in accordance with a video signal, a polarization-conversion device converting a uniform light beam exiting from the integrator into a linearly-polarized light beam to be applied to the image forming device, and a projection device projecting the image formed by the image forming device. The light source is constituted by a light emitting diode.

14 Claims, 8 Drawing Sheets

LIGHT INTENSITY

FIG.4
(a)
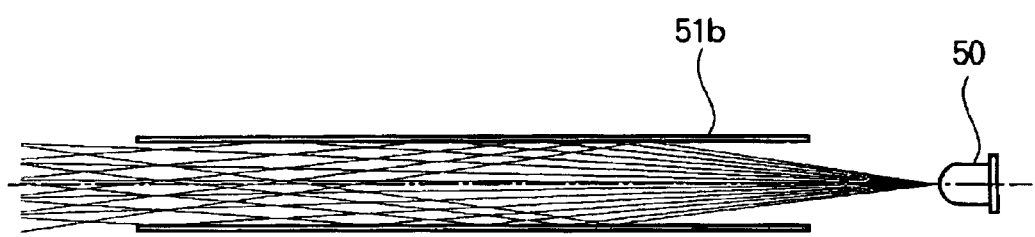
(c)
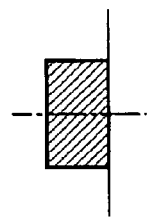
(b)
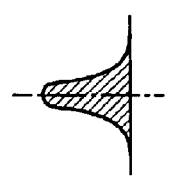

PROJECTION-TYPE DISPLAY APPARATUS

FIELD OF THE INVENTION

This invention relates to a projection-type display apparatus such as a liquid-crystal projector.

BACKGROUND OF THE INVENTION

A structure of an optical system of a conventional liquid-crystal projector is explained below with reference to FIG. 8. In this figure, the light emitted from the lamp 1 is reflected by the reflecting mirror 2 to become a collimated light beam 3. This collimated light beam 3 is not uniform in luminance distribution within its cross section normal to the direction of travel (optical path), which will cause a projected image to have unevenness in brightness if the beam 3 is used as it is. Therefore, the beam 3 is caused to pass through the multilens arrays 4, 5 each of which is comprised of small convex lenses that have been cut to have a rectangular profile, so that the beam has uniform luminance distribution within its cross section when illuminating a liquid crystal panel.

To be more specific, the collimated light beam 3 enters the multilens array 4, and is split into a plurality of light beams by its small convex lenses. Each of the splitbeams enters a corresponding small convex lens of the multilens array 5, and is led to the polarization-conversion device 6 to be converted into a linearly-polarized light beam. The linearly-polarized light beam exits from the condenser lens 7 as a beam converging on the plane of incidence of the liquid crystal panel. The beam emitted from the condenser lens 7 is folded by 90 degrees in its optical path by the mirror 8, and enters the dichroic mirror 20. The dichroic mirror 20 allows the red light beam to pass, and reflects the blue and green light beams.

The red light beam that has passed through the, dichroic mirror 22 is folded by 90 degrees in its optical path by the reflecting mirror 22 to illuminate the liquid crystal panel 10R after its converging angle is corrected by the collimator lens 9R.

On the other hand, the blue and green light beams reflected from the dichroic mirror 20 enter the dichroic mirror 21. The dichroic mirror 21 allows the blue light beam to pass, and reflects the green light beam. The green light beam reflected from the dichroic mirror 21 illuminates the liquid crystal panel 10G after its converging angle is corrected by the collimator lens 9G. The blue light beam that has passed through the dichroic mirror 21 is folded by 180 degrees in its optical path by the reflecting mirrors 23, 24 and the relay lens 15, 16 to illuminate the liquid crystal panel 10B after its converging angle is corrected by the collimator lens 9B.

The liquid crystal panel 10R modulates the incident light beam in accordance with an R-video signal, that is, allows only selected parts of the incident light beam to pass to form a red image. The red light beam that has passed through the liquid crystal panel 10R enters the dichroic prism 11, and is folded in its optical path to go into the projection lens 12. The liquid crystal panel 10G modulates the incident light beam in accordance with a G-video signal, that is, allows only selected parts of the incident light beam to pass to form a green image. The green light beam that has passed through the liquid crystal panel 10G enters the dichroic prism 11, and goes into the projection lens 12 directly. Likewise, the liquid crystal panel 10B modulates the incident light beam in accordance with a B-video signal, that is, allows only selected parts of the incident light beam to pass to form a blue image.

The blue light beam that has passed through the liquid crystal panel 10B enters the dichroic prism 11, and is folded in its optical path to go into the projection lens 12. The light beams of the red, green and blue images incident upon the projection lens 12 are combined and projected as a full-color image.

FIG. 9 shows a part of the optical system having the above-described structure. Shown in this figure is an optical path from the lamp 1 to the projection lens 12 via the liquid crystal panel 10G. However, the mirrors for changing the directions of the beams and the dichroic prism 11, etc. are omitted.

The light emitted from the lamp 1 is reflected by the reflecting mirror 2 to become a collimated light beam 3. The collimated light beam 3 having nonuniform luminance distribution within its cross section normal to the optical path are split into a plurality of light beams by the multilens array 4. The multilens array 4 focuses the light beams towards the multilens array 5. The multilens array 5 maintains the multilens array 4 and the liquid crystal panel 10 in a conjugate relation. A plurality of the light beams that have passed through the multilens array 5 enter the polarization-conversion device 6 and are split into two linearly-polarized light beams having mutually orthogonal vibration planes.

The vibration plane of one of the two linearly-polarized light beams is rotated by 90 degrees by the phase plate 13 disposed at the output plane of the polarization-conversion device 6. In consequence, all the light beams are converted into one linearly-polarized light beam having an identical vibration plane before entering the condenser lens 7. The condenser lens 7 causes the images of the small convex lenses of the multilens array 4 that are formed on the multilens array 5 to overlap with each other on the plane of incidence of the liquid crystal panel 10 in order to produce an illuminating light beam having a rectangular cross section within which luminance distribution is uniform. The collimator lens 9 disposed before the liquid crystal panel 10 uniforms the converging angles of the light beams that enter the liquid crystal panel 10.

The lamp 1 has a directivity as shown by the broken line in FIG. 10, and accordingly emits the light largely to the directions perpendicular to the optical axis. Therefore, the reflecting mirror 2 is necessary to lead the light toward the front along the optical axis and let the light in the optical system efficiently. The reflecting mirror 2 has a paroboloidal inner surface to reflect the light emitted from the lamp 1 so that it makes a collimated light beam.

In order to let the light incident from the lamp 1 in the optical system as much as possible to increase the efficiency of use of the light, it is necessary for the reflecting mirror 2 to have a large diameter D. In addition, in order to lead the light from the reflecting mirror 2 to the liquid crystal panel efficiently, it is necessary to make the areas of the optical devices such as the multilens array 4, the multilens array 5, the polarization-conversion device 6, and the condenser lens 7 about the same as the area of the opening of the reflecting mirror 2.

Accordingly, the size of the optical system of such a conventional projection-type display apparatus greatly depends on the size of its reflecting mirror for collimating the light emitted from its light source. Therefore, there has been a problem that when the size of the reflecting mirror is increased to improve the efficiency of use of the light, the optical system has to be upsized for that, and the apparatus is upsized as a consequence.

SUMMARY OF THE INVENTION

An object of the present invention is to increase the efficiency of use of the light without upsizing the optical system in a projection-type display apparatus.

This object is achieved by a projection-type display apparatus including a light source, an integrator whose input plane receives a light emitted from the light source and whose output plane serves as a surface illuminant, an image forming device modulating an incident linearly-polarized light beam to form an image in accordance with a video signal, a polarization-conversion device converting a uniform light beam exiting from the integrator into a linearly-polarized light beam to be applied to the image forming device, and a projection device projecting the image formed by the image forming device. The light source is constituted by a light emitting diode.

According to the present invention, a compact and lightweight projection-type display apparatus capable of displaying bright images can be provided.

BRIEF DESCRIPTION OF THE DRAWINGS

Embodiments of the invention will now be described by way of example and with reference to the accompanying drawings in which:

FIG. 4 shows a rod integrator comprised of a tubular reflecting mirror having a rectangular cross section for use in the projection-type display apparatus according to the invention;

DESCRIPTION OF THE PREFERRED EMBODIMENTS

Embodiment 1

Figure 1:
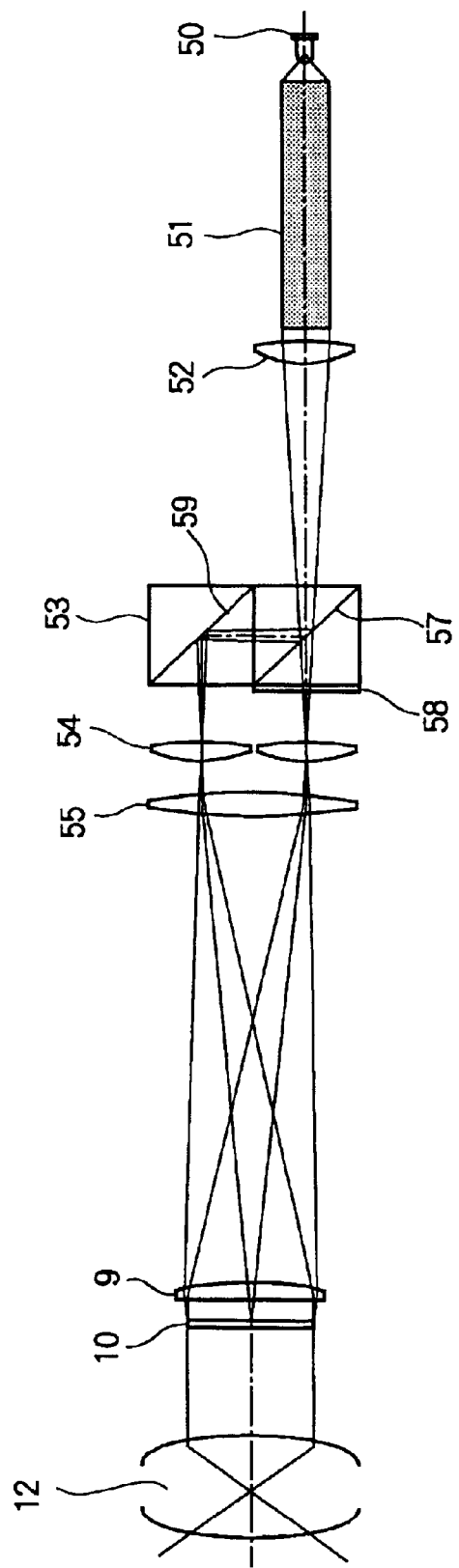
FIG. 1 shows a structure of an optical system of a first example of the projection-type display apparatus according to the invention.

FIG. 1 shows the structure of an optical system of one example of a projection-type display apparatus according to the invention. In order to facilitate explanation and understanding, only a part of the structure is shown in FIG. 1.

The optical system of the projection-type display apparatus of this example includes a light source 50, a rod integrator 51 whose output plane serves as a surface illuminant by converting the light emitted from the light source 50 into a uniform light beam, a polarization-conversion device 53 that converts the light beam exiting from the rod integrator 51 into a linearly-polarized light beam, an image forming device 10 such as a liquid crystal panel 10 that forms an image by modulating an incident light beam by use of an applied video signal, lenses 54, 55, 59 that focus the linearly-polarized light beam exiting from the polarization-conversion device 53 to form an image of the surface illuminant on the plane of incidence of the image forming device 10, and a projection lens 12 for projecting the image formed by the image forming device 10. The projection-type display apparatus of this example is characterized by using a light emitting diode as the light source 50.

Figure 2:
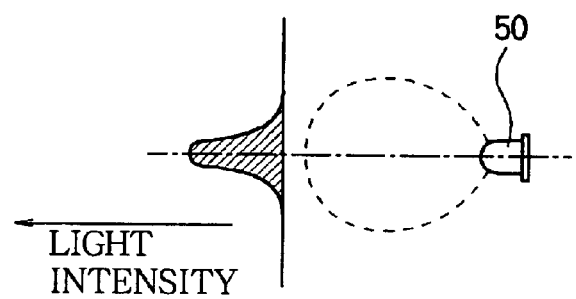
FIG. 2 is an explanatory view of directivity of a light emitting diode for use in the projection-type display apparatus according to the invention.

The light emitting diode 50 has such a directivity as shown by the broken line in FIG. 2. Most of the light emitted from this device moves forward because of its high directivity. Accordingly, unlike conventional apparatuses which use a lamp as the light source, it is possible to let the light in the optical system efficiently without combining a large reflecting mirror with the light source.

However, as seen from FIG. 2, the light emitted from the light emitting diode 50 has an intensity distribution in which the intensity is high in the center, and lowers with distance from the center. Therefore, if the image forming device 10 is illuminated directly by the light emitted from the light emitting diode 50, an image which is bright at its center and darkens with distance from the center is displayed.

Furthermore, since the plane of incidence of the image forming device 10 is rectangular while the cross section of the light emitted from the light emitting diode is circular, it is not possible to make efficient use of the light if it is used as-is.

Therefore, in this example, the rod integrator 51 is used in combination with the light emitting diode 50 to obtain an illuminating light beam having a rectangular cross section within which intensity distribution is uniform. The rod integrator 51 disposed in the vicinity of the light emitting diode 50 is made of glass shaped into a quadrangular prism.

Figure 3:
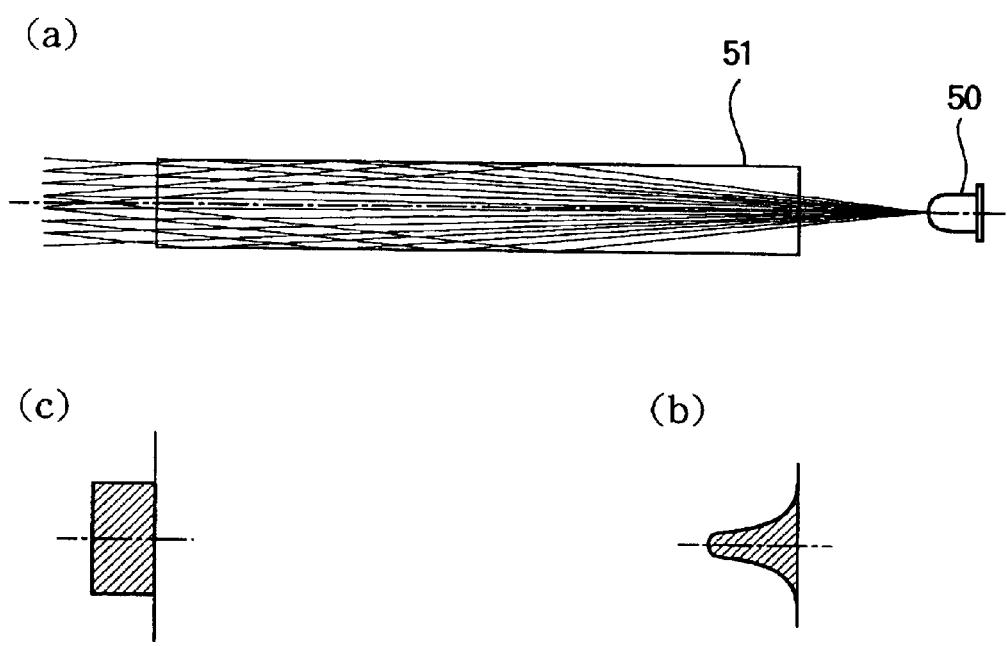
FIG. 3 shows a rod integrator comprised of a quadrangular prism made of glass for use in the projection-type display apparatus according to the invention.

FIG. 3(a) schematically shows how the light emitted from the light emitting diode 50 propagates in the rod integrator 51. The intensity distribution of the incident light at the plane of incidence of the rod integrator 51 is the same as the intensity distribution of the light emitted from the light emitting diode 51. Accordingly, as shown in FIG. 3(b), the intensity is high at the center of the plane and lowers with distance from the center.

The light that has entered the rod integrator 51 travels forward repeating total internal reflection, and as a result, has such an intensity distribution as shown in FIG. 3(c). Thus, a light beam having a uniform intensity distribution exits from the rod integrator 51. In this example, the output plane of the rod integrator 51 is made similar to the plane of incidence of the image forming device 10 to improve the efficiency of use of the light. The material of the rod integrator is not limited to glass. Any transparent material such as acrylic can be used if it can be shaped into a quadrangular prism and has a refractive index different from the air.

The same advantage can be obtained by using a tubular reflecting mirror having a rectangular cross section as shown in FIG. 4(a), FIG. 4(b), and FIG. 4(c) for the rod integrator 51. In this case, another advantage that the uniformity of the light at the output plane is improved is obtained, since the angle of incidence of the light to the mirror within the rod integrator 51 is the same as the angle between the direction of travel of the light emitted from the light emitting diode 50 and the optical axis, and therefore the light reflects more frequently than the case of using the glass prism. Furthermore, the rod integrator can be shortened if the extent of uniformity is not required to be more than that in the case of using the glass prism.

As shown in FIG. 1, the light beam exiting from the rod integrator 51 is focused by the lens 52 so as to converge at the lens 54, and enters the polarization-conversion device 53. The polarization-conversion device 53 splits the incident light beam into two polarized light beams having mutually orthogonal vibration planes. One component of the light beam that has entered the polarization-conversion device 53 vibrating on a specific plane passes thorough the polarization-separation film 57, and enters the lens 54 after its vibration plane is rotated by 90 degrees by the phase film 58. On the other hand, another component of the incident light beam vibrating on a plane orthogonal to the above specific plane is reflected by the polarization-separation film 57, and folded in its optical path by the reflection surface 59 to enter the lens 54.

The lens 54 forms the image of the output plane of the rod integrator 51 on the plane of incidence of the image forming device 10. The lens 55 combines the two light beams exiting from the polarization-conversion device 53 at the plane of incidence of the image forming device 10. The lens 9 corrects converging angles of the light beams entering the image forming device 10. By use of these lenses, it is possible to illuminate the image forming device 10 efficiently by the illuminating light having a rectangular cross section.

The image forming device 10 forms an image by modulating the incident light beam in accordance with a video signal. This image is projected by the projection lens 12.

As described above, in this example, the uniformly collimated light beam is produced by the light emitting diode 50 and the rod integrator 51 without using any large-diameter reflecting mirror. As a result, it is possible to make the collimated light beam smaller in cross-sectional area, and therefore, optical devices can be made smaller, thereby providing a compact and lightweight projection-type display apparatus having high efficiency of use of the light. Furthermore, a projection-type display apparatus whose light source has a long life is also provided because of the longevity characteristic of the light emitting diode.

Embodiment 2

Figure 5:
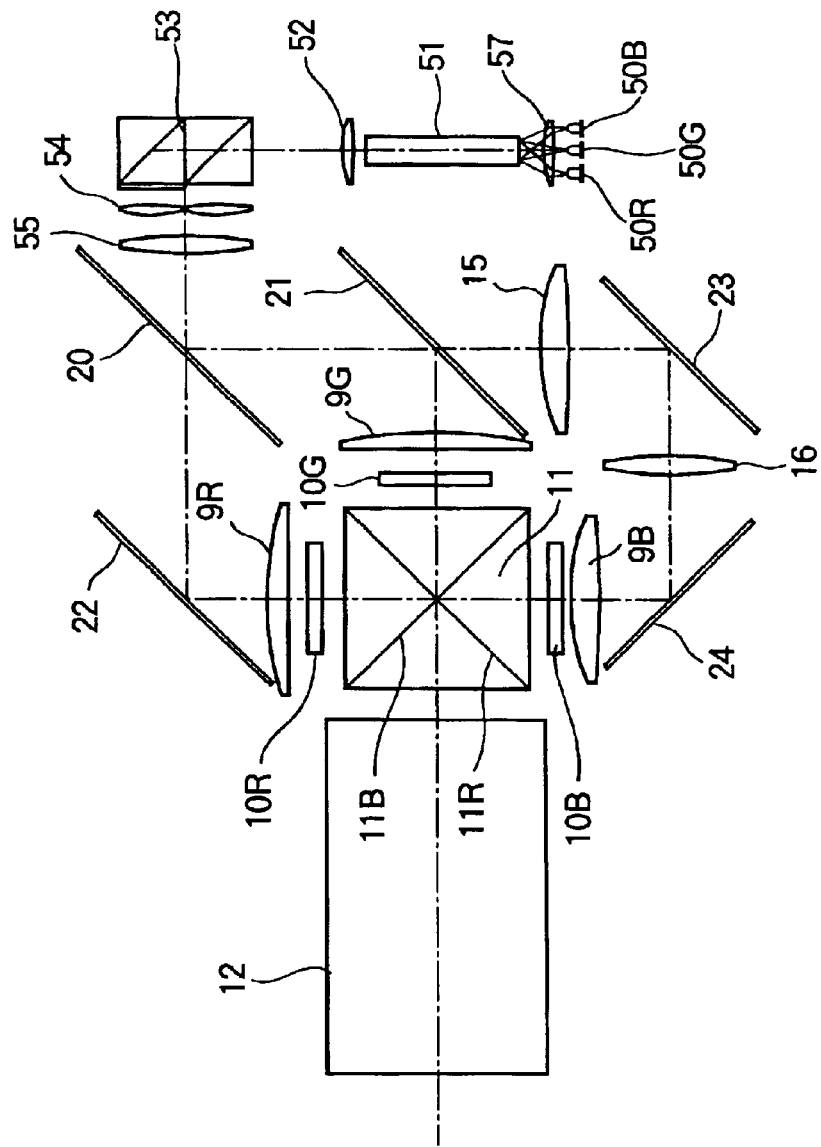
FIG. 5 shows a structure of an optical system of a second example of the projection-type display apparatus according to the invention.

FIG. 5 shows a structure of an optical system of a second example of the projection-type display apparatus according to the invention. As shown in this figure, the second example is characterized by using a plurality of light emitting diodes as a light source, namely, a light emitting diode 50R for emitting a red light, a light emitting diode 50G for emitting a green light, and a light emitting diode 50B for emitting a blue light.

The lights emitted from the light emitting diodes 50R, 50G, and 50B are condensed by the lens 57 and enter the rod integrator 51. The lights that have entered the rod integrator 51 travel forward repeating total reflection at the inner surface of the rod integrator 51, and become a collimated light beam having a rectangular cross section within which intensity distribution is uniform at the output plane. Accordingly, the output plane serves as a surface illuminant.

The lens 52 focuses the light beam exiting from the output plane of the rod integrator 51 so that it converges on the lens 54. The light beam exiting from the lens 52 is converted into a linearly-polarized light beam vibrating on a specific vibration plane, and enters the lens 54. The lenses 54 and 55 form the image of the output plane of the rod integrator 51 on the plane of incidence of the image forming device.

The light beam exiting from the lens 55 enters the dichroic mirror 20. The dichroic mirror 20 allows a red light beam to pass, and reflects blue and green light beams. The red light beam that has passed through the dichroic mirror 20 is folded by 90 degrees in its optical path by the reflecting mirror 22 to illuminate the liquid crystal panel (image forming device) 10R after its converging angle is corrected by the collimator lens 9R. On the other hand, the blue and green light beams reflected by the dichroic mirror 20 enter the dichroic mirror 21. The dichroic mirror 21 allows the blue light beam to pass, and reflects the green light beam. The green light beam reflected from the dichroic mirror 21 illuminates the liquid crystal panel (image forming device) 10G after its converging angle is corrected by the collimator lens 9G. The blue light beam that has passed through the dichroic mirror 21 is folded by 180 degrees in its optical path by the reflecting mirrors 23, 24 and the relay lens 15, 16 to illuminate the liquid crystal panel 10B (image forming device) after its converging angle is corrected by the collimator lens 9B.

The liquid crystal panel 10R modulates the incident light beam in accordance with an R-video signal, that is, allows only selected parts of the incident light beam to pass to form a red image. The light beam of the formed red image enters the dichroic prism 11, and is folded in its optical path by the reflection plane 11R to go into the projection lens 12. The liquid crystal panel 10G modulates the incident light beam in accordance with a G-video signal, that is, allows only selected parts of the incident light beam to pass to form a green image. The light beam of the formed green image enters the dichroic prism 11, and directly goes into the projection lens 12. The liquid crystal panel 10B modulates the incident light beam in accordance with a B-video signal, that is, allows only selected parts of the incident light beam to pass to form a blue image. The light beam of the formed blue image is folded in its optical path by the reflection plane 11B to go into the projection lens 12. The red, green, and blue light beams incident upon the projection lens 12 are combined and projected as a full-color image.

In the second example, since the light emitting diodes are used as a light source as in the case of the first example, it is possible to provide a compact and lightweight projection-type display apparatus, and also provide a projection-type display apparatus whose light source has a long life because of the longevity characteristic of the light emitting diode.

Furthermore, the second example has another advantage that color-adjustment to a projected image can be done easily since the red, green and blue light emitting diodes are provided separately as the light source. That is, in conventional apparatuses, color-temperature adjustment is performed by adjusting video signals applied to image forming devices such as liquid crystal panels, whereas in the second example of the invention, the same color-temperature adjustment can be performed by adjusting the number of enabled light emitting elements for each of the red, green, and blue light emitting diodes.

Embodiment 3

Figure 6:
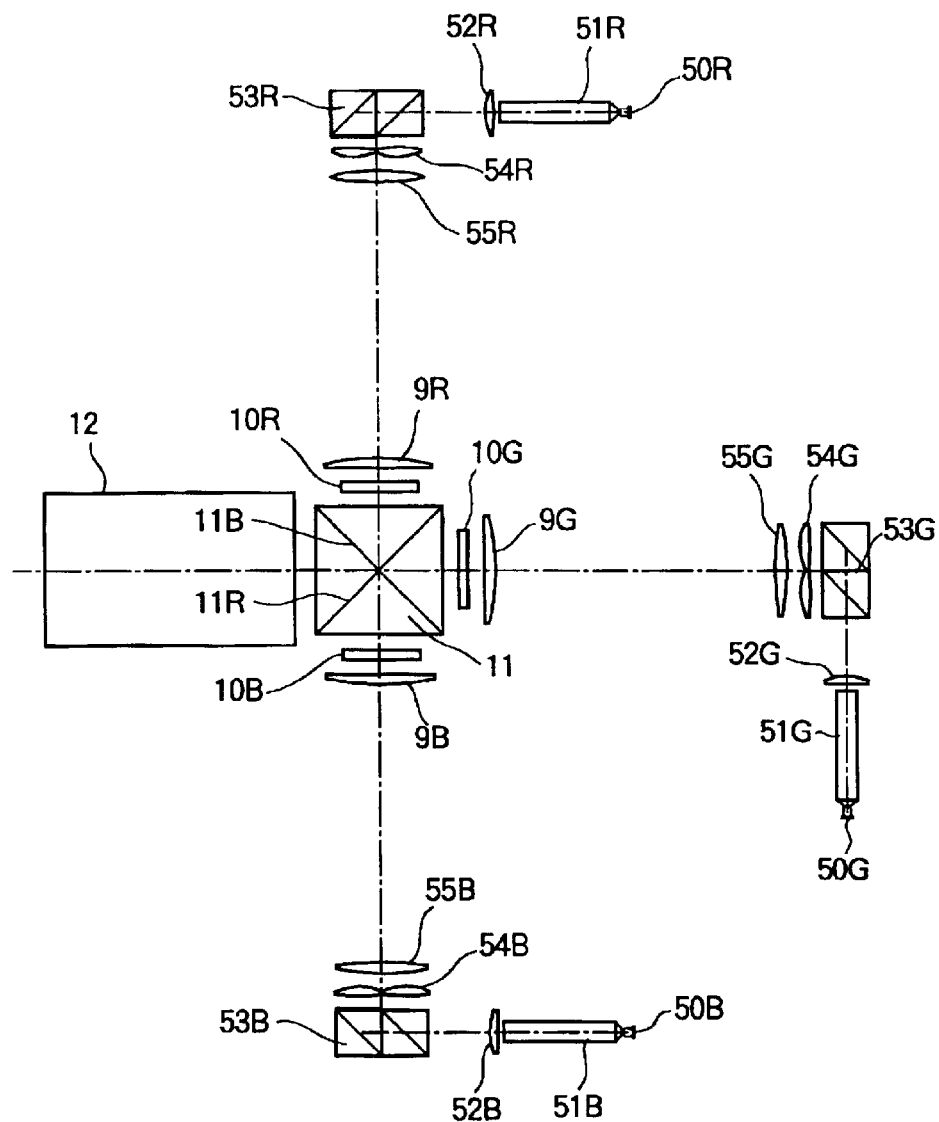
FIG. 6 shows a structure of an optical system of a third example of the projection-type display apparatus according to the invention.

FIG. 6 shows a structure of an optical system of a third example of the projection-type display apparatus according to the invention. As shown in this figure, the third example is characterized by separating the illuminating optical system into the one for red, the one for green, and the one for blue.

The light emitted from the red light emitting diode 50R enters the rod integrator 51R, repeats total reflection at the inner surface of the rod integrator 51R, and exits from the output plane as a uniform light beam. The light beam exiting from the rod integrator 51R is converted into a linearly-polarized light beam vibrating on a specific vibration plane by the polarization-conversion device 53R, and illuminates the red image forming device 10R efficiently through the lenses 52R, 54R, 55R, 9R. The light emitted from the green light emitting diode 50G enters the rod integrator 51G, repeats total reflection at the inner surface of the rod integrator 51G, and exits from the output plane as a uniform light beam. The light beam exiting from the rod integrator 51G is converted into a linearly-polarized light beam vibrating on a specific vibration plane by the polarization-conversion device 53G, and illuminates the green image forming device 10G efficiently through the lenses 52G, 54G, 55G, 9G. Likewise, the light emitted from the blue light emitting diode 50B enters the rod integrator 51B, repeats total reflection at the inner surface of the rod integrator 51B, and exits from the output plane as a uniform light beam. The light beam exiting from the rod integrator 51B is converted into a linearly-polarized light beam vibrating on a specific vibration plane by the polarization-conversion device 53B, and illuminates the blue image forming device 10B efficiently through the lenses 52B, 54B, 55B, 9B.

The light beams respectively modulated by the image forming devices 10R, 10G, 10B enter the dichroic prism 11 to go into the projection lens 12, and thereby a full-color image is projected.

In the third example, a plurality of light sources and a plurality of illuminating optical systems are provided separately for a plurality of image forming devices to eliminate dichroic mirrors for color separation, relay lenses for adjusting optical path length, etc., thereby enabling miniaturization of the apparatus and cost-reduction through reduction of parts count.

Embodiment 4

Figure 7:
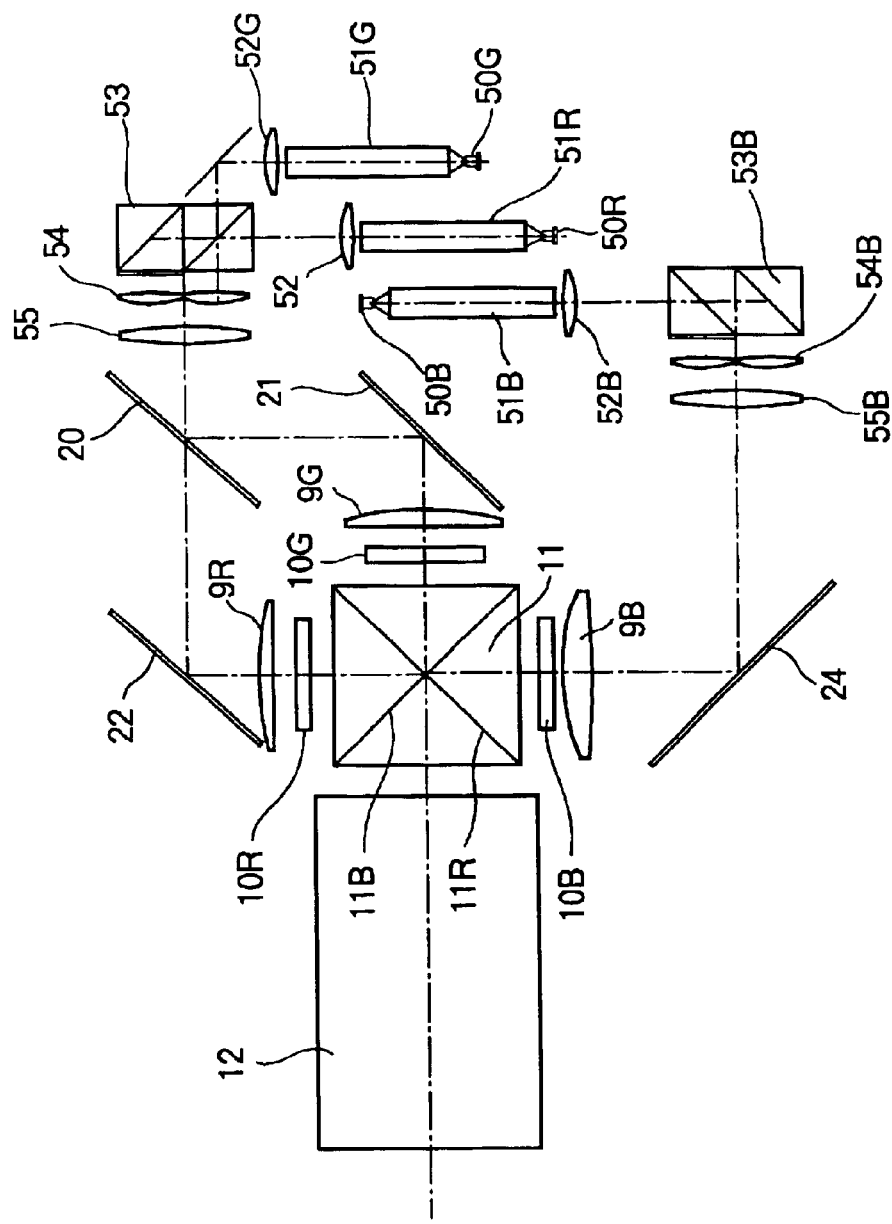
FIG. 7 shows a structure of an optical system of a fourth example of the projection-type display apparatus according to the invention.
Figure 8:
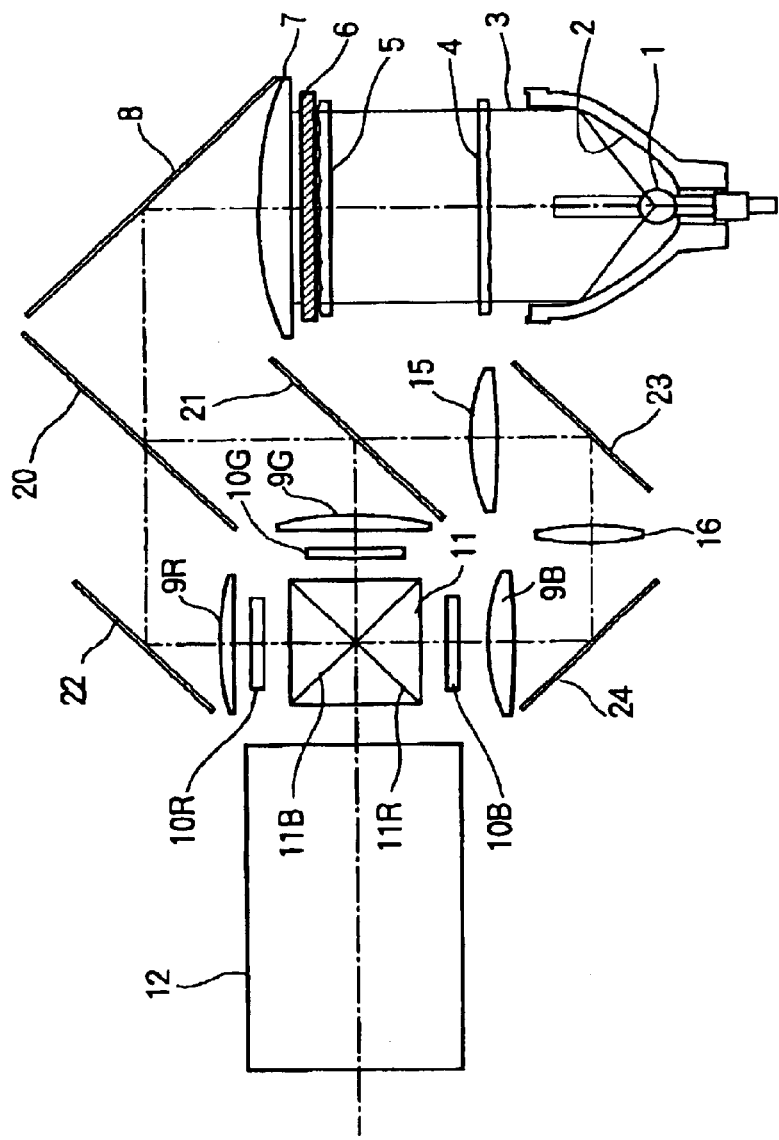
FIG. 8 shows a structure of an optical system of a conventional projection-type display apparatus.
Figure 9:
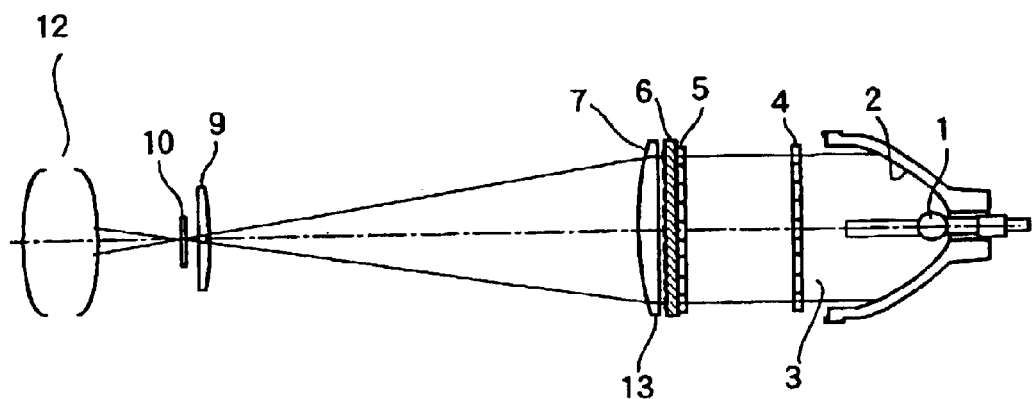
FIG. 9 shows a structure of an optical system of a conventional projection-type display apparatus.
Figure 10:
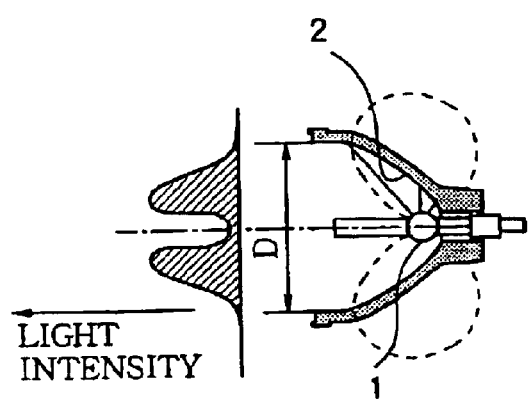
FIG. 10 is an explanatory view of a structure and directivity of a light source of a conventional projection-type display apparatus.

FIG. 7 shows a structure of an optical system of a fourth example of the projection-type display apparatus according to the invention. The fourth example is configured to have a light emitting diode and a rod integrator for each of R, G, and B separately as is the case with the third example. However, the fourth example is different from the third example in that the optical paths are shared in part.

In FIG. 7, the lights emitted from the red and green light emitting diodes 50R and 50G enter corresponding rod integrators 51R and 51G to be converted into uniform light beams respectively. The light beams exiting from the rod integrators 51R and 51G enter a common polarization-conversion device 53 where the red light beam is converted into a P-polarized light beam and the green light beam is converted into an S-polarized light beam. The P- and S-polarized light beams enter the lens 54. The P-polarized light beam (red light beam) and the S-polarized light beam (green light beam) exiting from the lenses 54, 55 are separated from each other by the dichroic mirror 20.

The red light beam that has passed through the dichroic mirror 20 is folded in its optical path by the reflecting mirror 22 to illuminate the image forming device 10R thorough the collimator lens 9R. The green light beam reflected from the dichroic mirror 20 is folded in its optical path by the reflecting mirror 21 to illuminate the image forming device 9G thorough the collimator lens 9G.

On the other hand, the light emitted from the blue light emitting diode 50B travels along an optical path other than the optical path along which the light emitted from the red light emitting diode 50R and the light emitted from the green light emitting diode 50G travel. That is, the light emitted from the blue light emitting diode 50B enters the rod integrator 51B, repeats total reflection at the inner surface of the rod integrator 51B, and exits from the output plane as a uniform light beam. The light beam exiting from the rod integrator 51B is converted into a linearly-polarized light beam vibrating on a specific vibration plane, and illuminates the blue image-forming device 10B through the lenses 52B, 54B, 55B, 9B.

The light beams respectively modulated by the image forming devices 10R, 10G, 10B enter the dichroic prism 11 to go into the projection lens 12, so that a full-color image is projected.

The fourth example is configured to have a light emitting diode and a rod integrator for each of R, G, and B separately as is the case with the third example, however, since the optical paths are shared in part, optical parts count can be reduced, thereby enabling miniaturization of the apparatus and cost-reduction.

In the fourth example, although the dichroic mirror 20 is used for separating the red light beam and the green light beam, it is possible to use a polarized-beam splitter instead for separating them since their vibration planes are orthogonal to each other.

The above explained preferred embodiments are exemplary of the invention of the present application which is described solely by the claims appended below. It should be understood that modifications of the preferred embodiments may be made as would occur to one of skill in the art.

What is claimed is:

1. A projection-type display apparatus comprising:
   a light source;
   an integrator whose input plane receives a light emitted from the light source and whose output plane serves as a surface illuminant;
   an image forming device modulating an incident linearly-polarized light beam to form an image in accordance with a video signal;
   a polarization-conversion device converting a uniform light beam exiting from the integrator into a linearly-polarized light beam;
   a beam separating device separating the light beam into a plurality of color components, each separate color component to be applied to a different plane of incidence of the image forming device; and
   a projection device projecting the image formed by the image forming device;
   wherein the light source comprises a light emitting diode.

2. A projection-type display apparatus according to claim 1, in which the integrator comprises a quadrangular prism made of glass.

3. A projection-type display apparatus according to claim 1, in which the integrator comprises a tubular reflecting mirror having a rectangular cross section and an inner surface on which a mirror is formed.

4. A projection-type display apparatus according to claim 1, in which
   the light source comprises a first light emitting diode for emitting a red light, a second light emitting diode for emitting a green light, and a third light emitting diode for emitting a blue light,
   the image forming device comprises a first liquid crystal panel for forming a red image, a second liquid crystal panel for forming a green image, and a third liquid crystal panel for forming a blue image,
   the polarization-conversion device converts the uniform light beam exiting from the integrator into a linearly-polarized light beam and separates the linearly-polarized light beam into a red component to be applied to the first liquid crystal panel, a green component to be applied to the second liquid crystal panel, and a blue component to be applied to the third liquid crystal panel, and
   the projection device combines the red image, the green image, and the blue image into a full-color image to be projected.

5. A projection-type display apparatus according to claim 2, in which
the light source comprises a first light emitting diode for emitting a red light, a second light emitting diode for emitting a green light, and a third light emitting diode for emitting a blue light,
the image forming device comprises a first liquid crystal panel for forming a red image, a second liquid crystal panel for forming a green image, and a third liquid crystal panel for forming a blue image,
the polarization-conversion device converts the uniform light beam exiting from the integrator into a linearly-polarized light beam and separates the linearly-polarized light beam into a red component to be applied to the first liquid crystal panel, a green component to be applied to the second liquid crystal panel, and a blue component to be applied to the third liquid crystal panel, and
the projection device combines the red image, the green image, and the blue image into a full-color image to be projected.

6. A projection-type display apparatus according to claim 3, in which
the light source comprises a first light emitting diode for emitting a red light, a second light emitting diode for emitting a green light, and a third light emitting diode for emitting a blue light,
the image forming device comprises a first liquid crystal panel for forming a red image, a second liquid crystal panel for forming a green image, and a third liquid crystal panel for forming a blue image,
the polarization-conversion device converts the uniform light beam exiting from the integrator into a linearly-polarized light beam and separates the linearly-polarized light beam into a red component to be applied to the first liquid crystal panel, a green component to be applied to the second liquid crystal panel, and a blue component to be applied to the third liquid crystal panel, and
the projection device combines the red image, the green image, and the blue image into a full-color image to be projected.

7. A projection-type display apparatus according to claim 1, in which
the light source comprises a first light emitting diode for emitting a red light, a second light emitting diode for emitting a green light, and a third light emitting diode for emitting a blue light,
the integrator comprises a first integrating device whose input plane receives the red light and whose output plane serves as a surface illuminant, a second integrating device whose input plane receives the green light and whose output plane serves as a surface illuminant, and a third integrating device whose input plane receives the blue light and whose output plane serves as a surface illuminant,
the image forming device comprises a first liquid crystal panel for forming a red image, a second liquid crystal panel for forming a green image, and a third liquid crystal panel for forming a blue image,
the polarization-conversion device converts a uniform light beam exiting from the first integrating device into a linearly-polarized light beam to be applied to the first liquid crystal panel, converts a uniform light beam exiting from the second integrating device into a linearly-polarized light beam to be applied to the second liquid crystal panel, and converts a uniform light beam exiting from the third integrating device into a linearly-polarized light beam to be applied to the third liquid crystal panel, and
the projection device combines the red image, the green image, and the blue image into a full-color image to be projected.

8. A projection-type display apparatus according to claim 2, in which
the light source comprises a first light emitting diode for emitting a red light, a second light emitting diode for emitting a green light, and a third light emitting diode for emitting a blue light,
the integrator comprises a first integrating device whose input plane receives the red light and whose output plane serves as a surface illuminant, a second integrating device whose input plane receives the green light and whose output plane serves as a surface illuminant, and a third integrating device whose input plane receives the blue light and whose output plane serves as a surface illuminant,
the image forming device comprises a first liquid crystal panel for forming a red image, a second liquid crystal panel for forming a green image, and a third liquid crystal panel for forming a blue image,
the polarization-conversion device converts a uniform light beam exiting from the first integrating device into a linearly-polarized light beam to be applied to the first liquid crystal panel, converts a uniform light beam exiting from the second integrating device into a linearly-polarized light beam to be applied to the second liquid crystal panel, and converts a uniform light beam exiting from the third integrating device into a linearly-polarized light beam to be applied to the third liquid crystal panel, and
the projection device combines the red image, the green image, and the blue image into a full-color image to be projected.

9. A projection-type display apparatus according to claim 3, in which
the light source comprises a first light emitting diode for emitting a red light, a second light emitting diode for emitting a green light, and a third light emitting diode for emitting a blue light,
the integrator comprises a first integrating device whose input plane receives the red light and whose output plane serves as a surface illuminant, a second integrating device whose input plane receives the green light and whose output plane serves as a surface illuminant, and a third integrating device whose input plane receives the blue light and whose output plane serves as a surface illuminant,
the image forming device comprises a first liquid crystal panel for forming a red image, a second liquid crystal panel for forming a green image, and a third liquid crystal panel for forming a blue image,
the polarization-conversion device converts a uniform light beam exiting from the first integrating device into a linearly-polarized light beam to be applied to the first liquid crystal panel, converts a uniform light beam exiting from the second integrating device into a linearly-polarized light beam to be applied to the second liquid crystal panel, and converts a uniform light beam exiting from the third integrating device into a linearly-polarized light beam to be applied to the third liquid crystal panel, and the projection device combines the red image, the green image, and the blue image into a full-color image to be projected.

10. A projection-type display apparatus according to claim 1, in which the light source comprises a first light emitting diode for emitting a red light, a second light emitting diode for emitting a green light, and a third light emitting diode for emitting a blue light, the integrator comprises a first integrating device whose input plane receives two of the red, green, and blue lights and whose output plane serves as a surface illuminant, and a second integrating device whose input plane receives the other one of the red, green, and blue lights and whose output plane serves as a surface illuminant, the image forming device includes a first liquid crystal panel for forming a red image, a second liquid crystal panel for forming a green image, and a third liquid crystal panel for forming a blue image, the polarization-conversion device converts a uniform light beam exiting from the first integrating device into a linearly-polarized light beam, and separates the linearly-polarized light beam into two components of the two of the red, green, and blue lights to be applied to corresponding two of the first, second and third liquid crystal panels, the polarization-conversion device further converts a uniform light beam exiting from the second integrating device into a linearly-polarized light beam to be applied to corresponding one of the first, second and third liquid crystal panels, and the projection device combines the red image, the green image, and the blue image into a full-color image to be projected.

11. A projection-type display apparatus according to claim 2, in which the light source comprises a first light emitting diode for emitting a red light, a second light emitting diode for emitting a green light, and a third light emitting diode for emitting a blue light, the integrator comprises a first integrating device whose input plane receives two of the red, green, and blue lights and whose output plane serves as a surface illuminant, and a second integrating device whose input plane receives the other one of the red, green, and blue lights and whose output plane serves as a surface illuminant, the image forming device includes a first liquid crystal panel for forming a red image, a second liquid crystal panel for forming a green image, and a third liquid crystal panel for forming a blue image, the polarization-conversion device converts a uniform light beam exiting from the first integrating device into a linearly-polarized light beam, and separates the linearly-polarized light beam into two components of the two of the red, green, and blue lights to be applied to corresponding two of the first, second and third liquid crystal panels, the polarization-conversion device further converts a uniform light beam exiting from the second integrating device into a linearly-polarized light beam to be applied to corresponding one of the first, second and third liquid crystal panels, and the projection device combines the red image, the green image, and the blue image into a full-color image to be projected.

12. A projection-type display apparatus according to claim 3, in which the light source comprises a first light emitting diode for emitting a red light, a second light emitting diode for emitting a green light, and a third light emitting diode for emitting a blue light, the integrator comprises a first integrating device whose input plane receives two of the red, green, and blue lights and whose output plane serves as a surface illuminant, and a second integrating device whose input plane receives the other one of the red, green, and blue lights and whose output plane serves as a surface illuminant, the image forming device includes a first liquid crystal panel for forming a red image, a second liquid crystal panel for forming a green image, and a third liquid crystal panel for forming a blue image, the polarization-conversion device converts a uniform light beam exiting from the first integrating device into a linearly-polarized light beam, and separates the linearly-polarized light beam into two components of the two of the red, green, and blue lights to be applied to corresponding two of the first, second and third liquid crystal panels, the polarization-conversion device further converts a uniform light beam exiting from the second integrating device into a linearly-polarized light beam to be applied to corresponding one of the first, second and third liquid crystal panels, and the projection device combines the red image, the green image, and the blue image into a full-color image to be projected.

13. A method for projecting an image, comprising:

receiving a non-uniform light beam and generating an output light beam with uniform intensity distribution;

converting the output light beam into a linearly-polarized light beam;

separating the linearly-polarized light beam into a plurality of color components;

receiving each color component at a different plane of incidence and forming an image in accordance with a video signal; and projecting the image for display.

14. The method of claim 13, wherein said separating includes separating the light beam into red, blue, and green components.

* * * * *